United States Patent
Burkart (10) Patent No.: US 8,076,596 B2
(45) Date of Patent: Dec. 13, 2011

(54) WEIGHING CELL WITH A RECEIVING HOLDER

(75) Inventor: Ralf Burkart, Börrstadt (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 191 days.

(21) Appl. No.: 12/090,075

(22) PCT Filed: Sep. 14, 2006

(86) PCT No.: PCT/DE2006/001613
§ 371 (c)(1),
(2), (4) Date: Jul. 24, 2008

(87) PCT Pub. No.: WO2007/041979
PCT Pub. Date: Apr. 19, 2007

(65) Prior Publication Data
US 2009/0008157 A1    Jan. 8, 2009

(30) Foreign Application Priority Data

Oct. 12, 2005   (DE) .................... 10 2005 048 724
Oct. 12, 2005   (DE) .................... 20 2005 015 932 U (51) Int. Cl.
*G01G 21/28* (2006.01)
*H01R 13/64* (2006.01)
*H05K 7/10* (2006.01)

(52) U.S. Cl. ........ 177/238; 177/244; 361/725; 361/726; 439/180; 439/246

(58) Field of Classification Search .......... 177/238, 177/244; 439/623, 180, 252, 246; 361/725, 361/726
See application file for complete search history.

(56) References Cited

U.S. PATENT DOCUMENTS

| | | | | |
|---|---|---|---|---|
| 2,802,188 A * | 8/1957 | Badders | ................ | 439/325 |
| 3,094,364 A * | 6/1963 | Liagg | ................ | 439/247 |
| 3,316,456 A | 4/1967 | Barlow | | |
| 3,478,301 A * | 11/1969 | Conrad et al. | ................ | 439/635 |
| 3,488,623 A * | 1/1970 | Stephenson et al. | ........... | 439/248 |
| 3,582,867 A * | 6/1971 | Thompson et al. | ........... | 439/362 |
| 3,803,533 A * | 4/1974 | Taplin | ................ | 439/328 |
| RE28,171 E * | 9/1974 | Anhalt | ................ | 439/261 |
| 3,904,265 A * | 9/1975 | Hollyday et al. | .............. | 439/469 |
| 3,977,749 A * | 8/1976 | Langenbach | ................ | 439/261 |
| 3,980,370 A * | 9/1976 | Gonzalez-Hernandez | ... | 439/137 |

(Continued)

FOREIGN PATENT DOCUMENTS

DE    102 04 104 C1   6/2003

(Continued)

OTHER PUBLICATIONS

Operating Manual ("Betriebsanleitung") for the Sartorius weighing cell WZV 1.5 SE (Nov. 2005).

(Continued)

*Primary Examiner* — Randy W Gibson
(74) *Attorney, Agent, or Firm* — The Culbertson Group, P.C.

(57) ABSTRACT

A weighing cell for use in an associated receiving holder, wherein the weighing cell and receiving holder are oriented relative to each other by means of alignment elements and through the use of the weighing cell in the receiving holder for the simultaneous production of a detachable, mechanical, and electrical connection to each other.

21 Claims, 2 Drawing Sheets

U.S. PATENT DOCUMENTS

| | | | | |
|---|---|---|---|---|
| 4,236,190 A | * | 11/1980 | Hollingsead et al. | 361/725 |
| 4,271,337 A | * | 6/1981 | Barkas | 200/51.09 |
| 4,285,412 A | * | 8/1981 | Wirth | 177/179 |
| 4,320,809 A | * | 3/1982 | Knothe et al. | 177/243 |
| 4,332,174 A | * | 6/1982 | Suzuki et al. | 73/862.633 |
| 4,416,343 A | * | 11/1983 | Knothe et al. | 177/180 |
| 4,458,296 A | * | 7/1984 | Bryant et al. | 361/691 |
| 4,749,369 A | * | 6/1988 | Wang | 439/459 |
| 4,815,547 A | * | 3/1989 | Dillon et al. | 177/25.14 |
| 4,845,591 A | | 7/1989 | Pavie | |
| 4,852,673 A | * | 8/1989 | Asai et al. | 177/25.18 |
| 4,853,823 A | * | 8/1989 | Arechavaleta et al. | 361/100 |
| 4,853,830 A | * | 8/1989 | Corfits et al. | 361/725 |
| 4,878,552 A | * | 11/1989 | Gebo et al. | 177/212 |
| 4,899,254 A | * | 2/1990 | Ferchau et al. | 361/695 |
| 4,957,177 A | * | 9/1990 | Hamilton et al. | 177/211 |
| 5,098,312 A | * | 3/1992 | Raczynski | 439/362 |
| 5,294,756 A | * | 3/1994 | Lauber et al. | 177/119 |
| 5,308,934 A | * | 5/1994 | Miller et al. | 177/244 |
| 5,459,289 A | * | 10/1995 | Burkhard | 177/244 |
| 5,518,418 A | * | 5/1996 | Larabell | 439/505 |
| 5,723,826 A | * | 3/1998 | Kitagawa et al. | 177/211 |
| 5,869,788 A | * | 2/1999 | Gordon et al. | 177/124 |
| 6,027,351 A | * | 2/2000 | Hashimoto | 439/160 |
| 6,450,822 B1 | * | 9/2002 | Eller | 439/248 |
| 6,566,613 B1 | | 5/2003 | Gesuita et al. | |
| 6,665,189 B1 | * | 12/2003 | Lebo | 361/730 |
| 6,830,476 B2 | * | 12/2004 | Gesuita et al. | 177/25.18 |
| 6,833,514 B2 | * | 12/2004 | Gesuita et al. | 177/25.18 |
| 6,929,501 B2 | * | 8/2005 | Huang | 439/362 |
| 7,208,688 B2 | * | 4/2007 | Jauert et al. | 177/238 |
| 7,397,003 B2 | * | 7/2008 | Cox et al. | 177/238 |
| 7,569,780 B2 | * | 8/2009 | Von Arb et al. | 177/210 R |
| 2002/0146934 A1 | | 10/2002 | Herrnring et al. | |
| 2003/0077932 A1 | * | 4/2003 | Lewinnek | 439/246 |
| 2005/0070145 A1 | * | 3/2005 | Huang | 439/246 |
| 2005/0081650 A1 | | 4/2005 | Bucher et al. | |
| 2006/0169063 A1 | | 8/2006 | Loher et al. | |

FOREIGN PATENT DOCUMENTS

| | | |
|---|---|---|
| DE | 10 2005 025 533 B3 | 12/2006 |
| EP | 0 825 425 A2 | 2/1998 |
| EP | 1 400 789 A2 | 3/2004 |
| GB | 2 402 267 A | 12/2004 |
| JP | 61-186821 A | 8/1986 |
| JP | 61-194320 A | 8/1986 |

OTHER PUBLICATIONS

JPO, Notification of Reason for Refusal issued on Feb. 16, 2011 in corresponding Japanese Patent Application No. 2008-534859 (3 pages) (English translation).

* cited by examiner

WEIGHING CELL WITH A RECEIVING HOLDER

TECHNICAL FIELD

The present invention relates to a weighing cell and a holder for receiving this weighing cell.

BACKGROUND

From the state of the art, it is known to integrate weighing cells in production machines, in order to accelerate weighing processes and simplify the technical setup of the production machine despite the weighing process. Known here are, in particular, applications from the fields of food and pharmaceuticals, in which products to be filled or packed are also weighed within the corresponding machine, in order to maintain given weight values or identify deviating filling amounts and, if necessary, separate them.

A disadvantage of many present systems is that the weighing-related components integrated into the production machine are often difficult to access, which becomes especially apparent in assembly, maintenance, and cleaning work. Accordingly, the replacement of weighing cells that are defective or that must be replaced for other reasons is often difficult. Even for multi-track applications, which depend on the smallest possible track spacing, easy access to the weighing components is necessary. In addition, poor access often requires a longer stoppage time for maintenance or assembly work and has an overall negative effect on the production process.

Also known is the attachment of weighing cells by means of adapter plates arranged on these cells. Here the adapter plates are screwed together with, or into each machine. This can generate mechanical stresses, which act on the weighing cell and negatively affect their function. Alternatively, weighing cells can be attached directly and without adapter plates, in which suitable (thread) boreholes on the bottom side of the weighing cells are used. In this situation also, mechanical stresses can occur and the production of boreholes costs time and money.

For the application of the load to be weighed on the load lead-in to the weighing cell, abrupt movements in any direction are to be avoided, in order not to risk sudden ringing of the measurement value. This requires an exact three-dimensional alignment of the load lead-in relative to the loads to be applied or load transport means.

SUMMARY OF THE INVENTION

Therefore, the task of the invention is to offer an easily replaceable weighing cell which can be adjusted exactly, i.e., oriented in three dimensions.

Various embodiments of invention are designed to allow, in a simple way, a complete coupling or decoupling of a weighing cell in such a way that the weighing cell should be suitable for the production of a detachable, mechanical and electrical connection to an associated, complementary receiving holder, wherein the mechanical and electrical connection is produced essentially simultaneously, but by all means within the scope of the insertion process or clamping of the weighing cell in the holder or locking of the weighing cell with the holder.

Below, "weighing cell" is to be understood, in particular, as a force measurement sensor for determining weight forces (e.g., according to the principle of electromagnetic force compensation, the vibrating string, the strain gauge, etc.), which can be equipped with or without evaluation electronics.

According to one embodiment of the invention, the weighing cell is provided for insertion into the associated receiving holder, wherein the receiving holder can be provided for long-term arrangement in a machine designed for weighing tasks. Such an arrangement may involve, in particular, a production machine, so that the receiving holder would be arranged there as a "docking station." The associated weighing cell can have alignment elements according to the invention which have a complementary form to the alignment elements of the receiving holder. In this way it is guaranteed that the weighing cell assumes an exactly definable position relative to the receiving holder during the insertion into the receiving holder and thus is also aligned very precisely as a whole in the production machine. The alignment elements of the weighing cell or the receiving holder interact in this sense and here determine mechanically the position of the weighing cell relative to the holder and thus also the position of the load lead-in elements of the weighing cell relative to the machine. The weighing cell here extends in a first horizontal X direction, a second horizontal direction Y perpendicular to the first horizontal direction, and a third Z direction perpendicular to the two X direction, Y.

Furthermore, for producing an electrical connection between the weighing cell and the holder, electrical contacts, which interact during the insertion of the weighing cell into the holder and which produce a detachable electrical connection, are provided on the weighing cell and on the receiving holder. By means of this electrical connection, which can be used, e.g., for power supply or signal transmission, the weighing cell is connected completely to the receiving holder during the insertion into the holder, without having to create such connections separately.

Therefore, the weighing cell can be connected in an especially simple way according to the invention to the holder or can be separated from it completely, in which the weighing cell is inserted into the holder or removed from it. Through the combined electrical and mechanical connection achieved during the insertion into the holder, the weighing cell can be made ready for operation quickly and easily and without additional work (screwing to mounting plate, manual production of individual electrical connections). Removal of the weighing cell from the holder causes, conversely, its complete mechanical and electrical separation from the holder and thus from the production machine or scale accommodating the holder.

One advantageous embodiment of the invention provides that the weighing cell can be connected to the holder via a quick-clamping connection. The device should allow a quick, manual coupling of the weighing cell to the holder, wherein this coupling is secured against unintentional detachment, without requiring a special tool—ideally without requiring any tool. The advantage relative to the state of the art lies in that the weighing cell can be connected to the receiving holder mechanically and electrically in an especially quick and simple way, ideally by means of a single quick-clamping element, exactly and securely. This eliminates the otherwise typical multiple screw connections of the weighing cell to the production machine. Advantageously, with the multiple screw connections, possible mechanical stresses are also eliminated, which could even be introduced into the weighing cell itself through such multiple screw connections and which could introduce error into the measurement results. An especially simple case of the quick-clamping connection is given by a clamping screw that can be activated by hand, which tensions the weighing cell and the holder against each other in the inserted state. An optionally spring-loaded, detachable latch mechanism, which connects the weighing cell in a stable and secure way to the holder and which is to be operated easily and without a tool, also satisfies this purpose.

Through the provided alignment elements, which exactly define the position of the weighing cell within the receiving holder, an additional alignment of the weighing cell relative to the production machine is no longer necessary. The weighing cell automatically assumes the provided position and is held securely and exactly in this position by the quick-clamping connection.

Another advantage of the one or more quick-clamping connections lies in that the insertion or the removal of the weighing cell can be performed essentially by a two-dimensional movement, while additional weighing cells can be arranged in the direction of the third dimension. In particular, for multiple-track systems, the weighing cells can be inserted or removed in the sense of a plug-in module, without having to remove the laterally adjacent weighing cells. In this case, the quick-clamping device can be arranged on the end side of the weighing cell, while absolutely no attachment devices are provided on both sides of the weighing cell, so that the weighing cell can laterally border, even contact flush against other weighing cells.

Another advantage of the invention named above lies in that through a single and exact adjustment of the receiving holder arranged in the production machine, no other adjustment processes are needed, if one or also different weighing cells one after the other are inserted into the receiving holder. These adjust themselves automatically and exactly into the desired position with reference to the alignment elements. An adjustment of the weighing cell after the insertion is thus no longer necessary. This saves time and allows the better utilization of the weighing cell or the entire production machine. (Here, "adjustment" is to be understood as the exact alignment according to orientation and position in space, not equalization between a measured and a displayed weight value.)

According to the invention, different weighing cell types can also be inserted into the receiving holder, as long as the corresponding alignment elements of the weighing cell and the receiving holder are complementary, that is, have a matching construction to each other. In particular, weighing cells for different weighing tasks or fields can be easily exchanged for each other and thus allow the use of the production machine for different weighing tasks within the shortest time.

Another advantageous embodiment of the invention provides that the alignment elements of the weighing cell and the receiving holder have guide elements, which run in the X direction and which have complementary constructions, in order to secure the weighing cell against rotation and/or lateral shifting perpendicular to the X direction during insertion into the receiving holder. These guide elements guarantee according to the invention that the weighing cell is guided at least in a first direction or that displacement perpendicular to this direction is not possible. Here, it can involve, in particular, a groove-and-tongue construction or, in general, a recess with a complementary raised section on the weighing cell or receiving holder, wherein the resulting profile interacts accordingly. Conceivable is, in particular, a wide guide groove (recess) on the bottom side of the weighing cell, while the associated receiving holder has a corresponding raised section on its top side (positive-fit connection). Such guide elements simplify the insertion of the weighing cell considerably and can guarantee—according to definable processing tolerances—an exact positioning of the weighing cell relative to the receiving holder in the region of a hundredth of a millimeter.

The guide elements further create a simplified insertion of the weighing cell if this is to be placed on the receiving holder somewhat like a plug-in module. If the weighing cell extends essentially in a longitudinal X direction, which simultaneously represents the plug-in direction, then the guide elements similarly aligned in the X direction already automatically align the weighing cell during the insertion process and prevent twisting and/or lateral shifting perpendicular to the X direction.

Another advantageous embodiment of the invention provides that the alignment elements of the weighing cell each include at least one stop means, which interact, in the inserted state, with at least one complementary stop means of the alignment elements of the receiving holder, in order to fix the position of the weighing cell relative to the receiving holder in the directions X and Z. These stop means ensure according to the invention that the weighing cell assumes an exactly definable relative position relative to the receiving holder in the X or Z direction. As stop means acting in the Z direction, for example, a surface of the receiving holder pointing toward the weighing cell is conceivable, on which the weighing cell rests in the inserted state. A stop acting in the X direction can be formed, for example, by a projection extending in the Z direction, which interacts with a corresponding complementary surface of the weighing cell.

Through the means named above, at first the weighing cell can be pre-positioned, in that it is inserted into the receiving holder in such a way that initially the guide elements running in the X direction prevent lateral shifting perpendicular to this direction and allow or support shifting of the weighing cell in the X direction. Here, the weighing cell according to the invention can contact a contact surface of the receiving holder, which functions as a stop acting in the Z direction.

For the further shifting of the weighing cell in the X direction (here, a direction is always to be understood also as the opposite direction, if not described otherwise) the weighing cell finally reaches the projection acting as a stop in the X direction, and is thus defined in all three spatial directions in its position relative to the receiving holder.

As an addition to the means described above, another advantageous embodiment of the invention provides on the weighing cell at least one centering means, which interact in the inserted state with complementary centering means of the receiving holder. In this way, the position of the weighing cell relative to the receiving holder is fixed in at least two spatial directions, wherein additional positioning reliability or stability is achieved. The centering means can involve, in particular, a peg-bushing construction, in which an optionally cone-shaped peg of the weighing cell projects into a bushing arranged on the holder and complementary to this peg during the insertion into the receiving holder. The optionally cone-shaped centering surface of the centering pin and the complementary wall of the one or more bushing provides for an exactly definable alignment of the weighing cell relative to the receiving holder.

In particular, an arrangement is conceivable in which the centering means are moved in the direction toward the stop acting in the X direction for an advancing movement of the weighing cell in the X direction and in this way engage at least partially in the bushing or bushings described above. The centering bushing can be formed in an especially easy way in the projection, which represents the stop acting in the X direction.

An especially simple form of the peg construction can simultaneously act as centering means with reference to all three spatial directions. Here, a cone-shaped peg of the weighing cell (or the holder) projects with its conical outer surface into a cylindrical recess (borehole) of the holder (or the weighing cell) and defines an exact position of the weighing cell and holder relative to each other, when the peg is pushed so far into the borehole that the outer surface contacts over the entire periphery or at least along a contact line and/or the increasing diameter of the cone prevents further insertion into the borehole. In this way, the weighing cell is fixed relative to the holder in all three spatial directions.

The quick-clamping device can be constructed advantageously in such a way that it forms a clamping force between the weighing cell and the receiving holder simultaneously in at least two of the X, Y, and Z directions. In this way, the weighing cell is tensioned against the holder in these directions. Such a multi-dimensional clamping effect has the result that the weighing cell rests in an especially secure way on the receiving holder and can be pressed, in particular, against several stops acting perpendicular to each other. In particular, the case is conceivable that the quick-clamping device is constructed in the form of a pivoting locking screw, which is attached to the holder (or to the weighing cell) and which presses on a surface inclined at, e.g., 45 degrees on the housing of the weighing cell (or on the holder), when the locking screw is tightened. By means of the inclined surface, tensioning forces are introduced into the horizontal or vertical component of the surface inclination. As to be seen in the figure, through these simple quick-clamping means, tension can be generated, e.g., in the Z direction against the receiving holder and, in addition, also, e.g., in the X direction against a stop of the receiving holder. The weighing cell therefore sits especially securely in the receiving holder.

An advantageous embodiment of the weighing cell in connection with the receiving holder concerns at least one electrical plug contact of the weighing cell for transmitting power-supply voltage and/or signals. This plug contact should be connected according to the invention to a complementary plug contact during the insertion into the holder. Therefore, it is advantageously guaranteed that through the mechanical insertion of the weighing cell into the receiving holder, the electrical contact between the weighing cell and holder is realized simultaneously, in order to provide, for example, power-supply voltage for the weighing cell or to tap measurement data, e.g., to transmit it to an external controller or display. Furthermore, when the weighing cell is removed from the holder, the plug connection is also detached again automatically, so that with a few hand actions (detachment of the quick-clamping connection, pulling out the weighing cell from the holder), the weighing cell is decoupled completely and can be replaced directly by another weighing cell. In particular, different plug contacts are conceivable (for power supply, signal transmission, etc.), which simultaneously interact with complementary plug contacts on the weighing cell or the holder. Maintenance and replacement work will be accelerated considerably in this way, because no separate cable connections between the weighing cell and holder or production machine have to be detached or established. The use of spring contacts for the plug connections here allows an especially reliable electrical connection.

Through the uniquely defined fixed arrangement of the plug connections, the inadvertently inclined and/or twisted placement of plugs or incorrect pole alignment or even a short circuit due to incorrect production of the plug connection is reliably excluded.

To protect the one or more plug connections named above from external influences as well as possible, an advantageous embodiment of the invention provides that the contact is completely enclosed by the weighing cell and receiving holder in the inserted state of the weighing cell in the holder. Here, the weighing cell and holder enclose overall a housing, which surrounds the plug connection completely and in a protective way. In addition, by the defined position of the plug connection, an unfavorable cable outlet from the weighing cell is prevented, which in practice often lies where the user has no appropriate place in his machine. The electrical connection of the weighing cell can be realized advantageously exclusively by means of the plug connection named above, wherein the corresponding cable connections are eliminated and possible connection problems due to damaged or loose cables are bypassed in advance, because then, for the assembly and disassembly of the cell into or out of the holder, a movement of cables or cable ends is not realized.

One improvement of the invention provides that a protective device is provided for electrical contacts that can be connected to the weighing cell or plug connections of the receiving holder or the weighing cell, wherein this protective device automatically protects the contacts on the holder and/or the weighing cell from contamination when the weighing cell is removed. Such a protective device can be constructed mechanically, electrically, electromechanically, pneumatically, or in some other way. In particular, a simple spring-loaded mechanism is advantageous, which folds out a cover protecting the plug contacts when the weighing cell is inserted into the holder, in order to allow the connection. If the weighing cell is removed again from the receiving holder, the cover folds back in front of the contacts for protection and seals these contacts from dirt, moisture, aggressive cleaning agents, or other contacting or touching endangering the safety of the weighing cell or the personnel.

With respect to the plug connections named above, another advantageous embodiment of the invention in formed to the extent that an electrical or mechanical locking device interacting with the weighing cell is provided, in order to turn on electrical contacts that can connect via the receiving holder to the weighing cell only when the weighing cell is inserted in the holder and/or a different definable electrical, mechanical, and/or electromechanical contact has been created between the weighing cell and holder. In this way, basically a switching sequence is guaranteed so that sensitive or high voltage-carrying plug connections are charged with voltage or signals only when the weighing cell is inserted largely or completely into the holder. Such an open connection can also be realized by an electrical contact, in particular, a spring contact, which must be realized between the weighing cell and holder, in order to connect another plug connection in series or selectively by a control unit. It is conceivable, in particular, to establish or release different plug connections one after the other during the insertion or removal of the weighing cell from the receiving holder or to activate switch mechanisms, in order to switch downstream plug connections as a function of this action.

Apart from this predominantly mechanical variant, the connection of certain contacts by means of relays or a controller (optionally also arranged separately) is also conceivable, when other definable contacts are closed or activated during the insertion of the weighing cell in the holder. As a result, it is guaranteed that certain components of the weighing cell (or also the receiving holder) are connected only under defined conditions or secured electrical connections. Thus, good protection against undesired operation of motors or other transport or actuator units or the undesired voltage supply to components or contacts can be provided.

In this connection, another embodiment of the invention provides that the weighing cell and associated receiving holder are constructed in such a way that during the insertion, initially a mechanical connection is forcibly produced (at least with respect to a first direction) before a first or a freely definable electrical, mechanical, or electromechanical contact is realized between the weighing cell and holder. For explosion-protection purposes, the mechanical connection can have an already stable construction, so that for the realization of an electrical contact following in time with a possible ignition of an explosive mixture, the explosive pressure of the weighing cell with the associated holder is held securely. Furthermore, the mechanical connection can be constructed so that the possible explosion zones between the weighing cell and holder are already sealed so that the connection regions are flashback resistant and the propagation of the explosion to the outside of the weighing cell/receiving holder arrangement is stopped. Naturally, for the disassembly of the weighing cell, that is, its separation from the holder, the corresponding functions can be reversed, so that all or at least the relevant electrical contacts are separated before the explosion-protective mechanical connection is detached.

For example, such a mechanical connection can be produced as a dovetail connection. Tight joint tolerances or complementary labyrinth-like surfaces of touching contact surfaces of the weighing cell and holder can prevent flashback.

Another advantageous embodiment of the invention provides that the weighing cell has, for protection from mutual electromagnetic influences, at least an essentially hermetically separated region or space, which is provided essentially for receiving the weighing cell electronics. Through this construction of the best possible electromagnetically isolated spaces, an influence, in particular, on the weighing cell electronics by external influences is avoided. The electromagnetic protection exists, on one hand, advantageously up to the mechanical components of the weighing cell, wherein these components can be arranged adjacent to the protected space. Alternatively or additionally, there is also protection from electromagnetic radiation from the region of the adjacent receiving holder, when the weighing cell is inserted there.

In particular, another advantage of the shielding is presented in connection with the receiving holder. If filters are provided in the electrical supply lines to the receiving holder, in order to reduce or prevent effects of electromagnetic noise, for example, by high-frequency signals (HF) on the cable, then this measure is also sufficient for different weighing cells that can be inserted into the holder, without each of these weighing cells having to be protected similarly by corresponding filters. Because the weighing cells are already protected against external electromagnetic influences by the mentioned construction of the spaces of the weighing cell, a filter device on the receiving holder is sufficient for the electromagnetic protection of any weighing cell/receiving holder combination. Therefore, an especially more secure operation of the weighing cell and receiving holder combination is possible. Simultaneously, the weighing cell placed on the holder with its electromagnetically protected spaces also acts as shielding of the plug contacts, which—as described above—are enclosed by the assembled unit. Special protective measures or EMC-based plug connections against, for example, line-carried HF signals are therefore unnecessary in the weighing cell and/or the receiving holder themselves.

Additionally or alternatively, the separation of the spaces of the weighing cell mentioned above can also be constructed with respect to heat, so that heat conduction or heat flow from one space into the other is largely avoided. This is selected especially to keep the operating heat generated in the region of the weighing cell electronics away from the mechanical and very sensitive components of the weighing cell, so as not to falsify the measurement result.

The hermetically separated region or space can also be constructed as an explosion-proof space.

Another advantageous embodiment of the invention provides that the receiving holder has an electrical connection space for the arrangement of electrical or electronic components. In particular, switching elements, which ensure the selective open connection of the plug contacts between the weighing cell and receiving holder, can be housed in this space, wherein this open connection can be realized, for example, by means of a relay. Alternatively or additionally, however, such a space is also suitable for receiving weighing cell electronics. For example, the actual weighing cell can essentially include the mechanical components. The current or a corresponding signal received optionally at a compensating coil is then forwarded via a plug contact to the receiving holder and into the connection space there, in order to perform the further preparation of the weighing cell signals there. Also, additional control components with computational power (CPU), electronic components for communications or network purposes, input/output channels, and also controllers for other, weighing-independent tasks of the machine (memory programmable control) can be housed there according to the invention.

This spatial and parts-related separation of mechanical components in the weighing cell on one side and associated electronic components in the receiving holder on the other side allows a space-saving construction of the weighing cell and optionally reduces the number of necessary plug connections between the weighing cell and receiving holder and supports one possible modular assembly of the weighing cell or the weighing cell/receiving holder combination. In addition, the electronics in the connection space of the receiving holder have good, long-term protection and can also be separated with respect to electromagnetic radiation from the mechanical components of the scale arranged above or other components of the production machine.

Another advantageous embodiment of the invention provides means for mutual calibration locking between the weighing cell and receiving holder. For protection from or as an identifying feature of unauthorized changes to the weighing cell (or data or program parts stored in the weighing cell), for example, adhesives or seals can be provided, which make changes easy to identify and also clearly documents unauthorized replacement of the weighing cell arranged in the holder for another.

As means for the calibration locking, those that secure the calibration-relevant data of the weighing cell from changes can be used. This can also be realized by moving the weighing cell data into special memory within the receiving holder, which is protected against changes. Simultaneously or alternatively, means can be provided which prevent or document changes to a defined, calibration-tested combination of a holder with a defined weighing cell. The unauthorized replacement of a weighing cell for another is then not possible in an unnoticeable way.

As an alternative to "hardware"-like security mechanisms, which can be inspected or installed only with difficulty into tight spaces and for poor viewing conditions, in particular, an electronic, calibration-related solution can also be provided in the sense of "software"-like security. Here, it can involve, for example, an electronic calibration counter, which changes automatically and non-reversibly for a change to the calibration data of a stored count value ("Audit Trail Count") and thus documents a change (possibly also an unauthorized change) to the calibration data. The (mechanical) replacement of a weighing cell for another would also be registered as access to the calibration data and documented accordingly.

The means for documenting such (also unauthorized) access to the calibration data can be arranged either in the holder or also in the weighing cell. In particular, it is possible to keep the system-relevant parameters of the weighing cell in a suitable controller or in electrical memory arranged in the holder.

In principle, one of the calibration-related locks can also be used independent of the weighing cell with the receiving holder, that is, also for other scales.

In addition to the advantages of the invention named above, it is to be noted that the weighing cell and receiving holder can be produced separately and different combinations of weighing cells with always fitting receiving holders are possible. Due to the plug connections that can be integrated, there are no longer free cable ends or otherwise susceptible plug connections are provided in the weighing system. In particular, a very good alignment or attachment of the weighing cell to the receiving holder is guaranteed by the alignment elements or stops, without providing a plurality of external screws or other attachment components on the housing of the weighing cell or the receiving holder. By means of the one or more quick-clamping connections, the number of required attachment means is reduced to a minimum, the components can be connected to each other easily and securely, and there is less space or points of attack for water, dirt, etc. By means of the especially easy to remove weighing cell, cleaning is also very easy. The easy separation of the weighing cell and holder also allows, in a simple way, a first weighing cell to be removed from the holder and replaced by a second. The weighing operation can continue without significant interruption, while the first weighing cell can be subjected to, e.g., quality-control function tests in an external station.

Additional advantages and features of the invention are found in the drawing, detailed description, and claims below. An embodiment will be described in more detail below with reference to a figure example.

DETAILED DESCRIPTION

Figure 1:
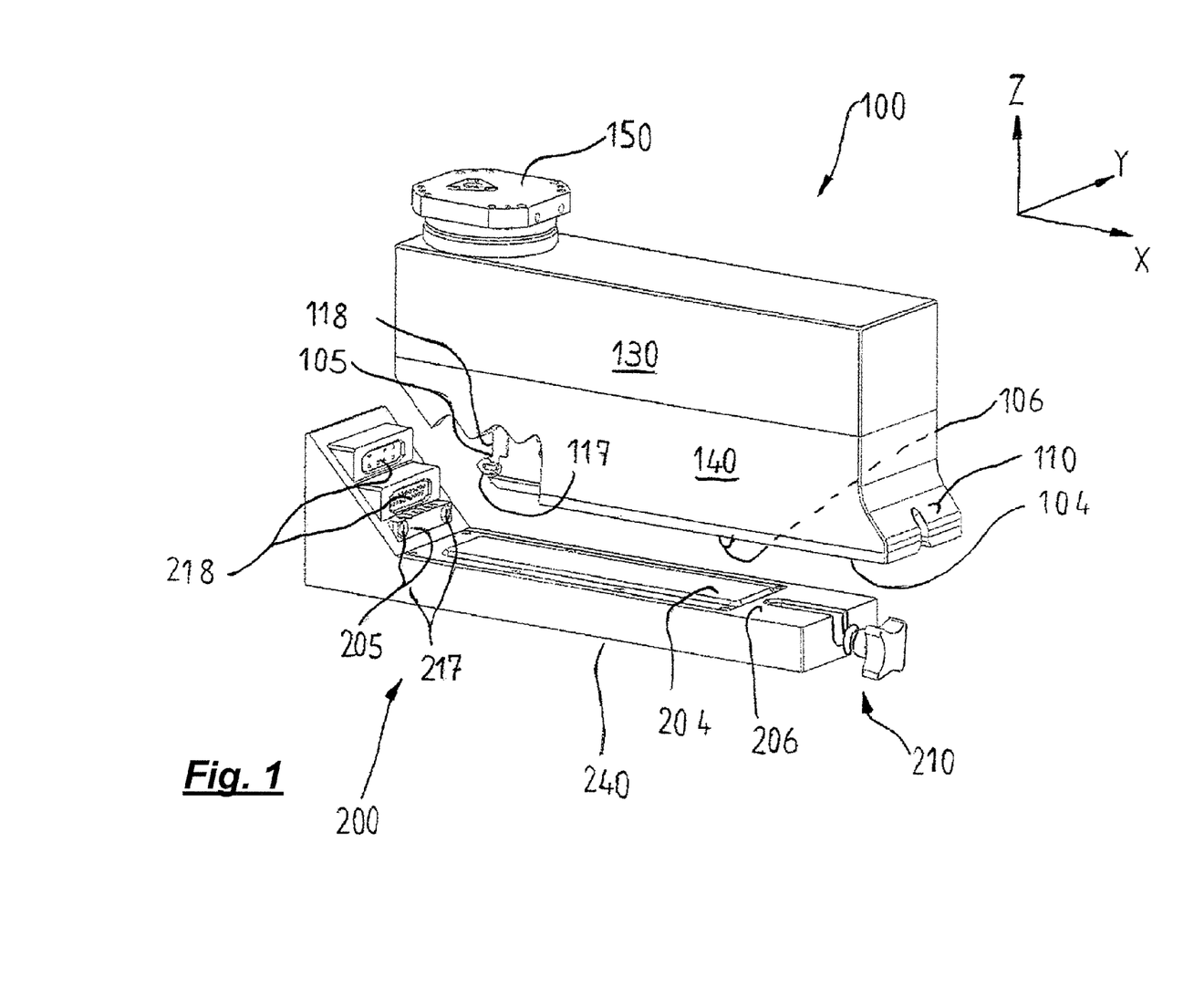
FIG. 1 shows a perspective view of a weighing cell with associated receiving holder.

In FIG. 1, a combination of a weighing cell with matching receiving holder is shown in a perspective and schematic view.

In the upper part of FIG. 1, a weighing cell 100 is arranged, on whose load lead-in 150 a weight force to be measured can be introduced. The weighing cell 100 has two spaces 130 and 140 hermetically separated from each other, wherein predominantly mechanical force transmission elements of the weighing cell are arranged in space 130, while the weighing cell electronics are to be arranged in the lower space 140. In particular, the space 140 is especially shielded against electromagnetic effects from the outside, in order to largely prevent interference in the electronics.

In the lower region of the weighing cell 100 or on its bottom side, there are alignment elements 104, 105, 106, in order to be able to position the weighing cell 100 relative to the receiving holder 200 shown underneath the weighing cell. The alignment element 104 is constructed as a guide groove (not visible in FIG. 1) on the bottom side of the weighing cell, wherein this guide groove can be filled by a complementary raised section 204 of the receiving holder 200, when the weighing cell is placed on the holder.

As another alignment element, the weighing cell has on its bottom side an essentially planar stop face 106 (this is hidden in the perspective view in FIG. 1 by the body of the weighing cell 100 and directly faces the holder 200 arranged underneath). The stop face 106 interacts with a corresponding counter face 206 of the receiving holder 200 and defines the position of the weighing cells 100 relative to the receiving holder 200 in the Z direction.

Another alignment device of the weighing cell 100 is constructed as a stop face 105 in the X direction, which interacts with a corresponding counter face 205 of the receiving holder 200 and which defines the relative position of the weighing cell 100 relative to the holder 200 in the inserted state in the X direction.

Special fixing of the relative position of the weighing cell 100 relative to the holder 200 in the Y direction is achieved by two centering pins 117, which project, in the inserted state, into two complementary recesses 217 of the receiving holder 200 and thus reliably prevent a shifting of the weighing cell 100 relative to the receiving holder 200 in the Y direction. The centering pins 117 have a conical surface, which interacts with corresponding complementary surfaces of the recesses 217 and allow an exact positioning of the weighing cell.

In the inserted state, the weighing cell 100 can be connected detachably to the receiving holder 200 via a quick-clamping device 210. The quick-clamping device 210 has a locking screw that can pivot in the receiving holder 200 and that can pivot in the inserted state of the weighing cell 100 by measure in the direction toward the weighing cell 100 and here penetrates a slot provided in the weighing cell. At the upper end of the slot there is a stop surface 110, which is inclined by approximately 45 degrees to the horizontal and against which the clamping screw can be tensioned in the inserted state of the weighing cell. Through this clamping-screw device, the weighing cell 100 is pressed in the inserted state both in the direction toward the stop 205 and also in the direction toward the stop 206, by means of which the relative position between the weighing cell 100 and receiving holder 200 is maintained by force.

Furthermore, there are plug connections between the weighing cell 100 and receiving holder 200, wherein (in FIG. 1 covered, in perspective, by the body of the weighing cell 100) plug contacts 118 of the weighing cell 100 interact with complementary contacts 218 of the receiving holder and produce, in the inserted state of the weighing cell 100 in the receiving holder 200 a connection between the contacts 118 and 218. The plug contacts 118, 218 are completely surrounded in the assembled state by the weighing cell 100 and receiving holder 200 and are reliably protected against external influences such as contamination or touching. The space 140 of the weighing cell 100, which is especially protected against external electromagnetic influences, is placed in the inserted state at least partially over the plug contacts 118, 218 and thus also provides for electromagnetic shielding of these contacts.

Finally, in the receiving holder 200 a space 240 is formed, which is constructed for receiving additional electronics. These can involve weighing cell electronics or also safety circuits, which allow the connection of individual plug contacts only after the creation of other contacts or after the activation of certain safety switches. Additional control components with computational power (CPU), electronic components for communications or network purposes or input/output channels, and also controls for other, weighing-independent tasks of the machine can be housed there according to the invention.

Figure 2:
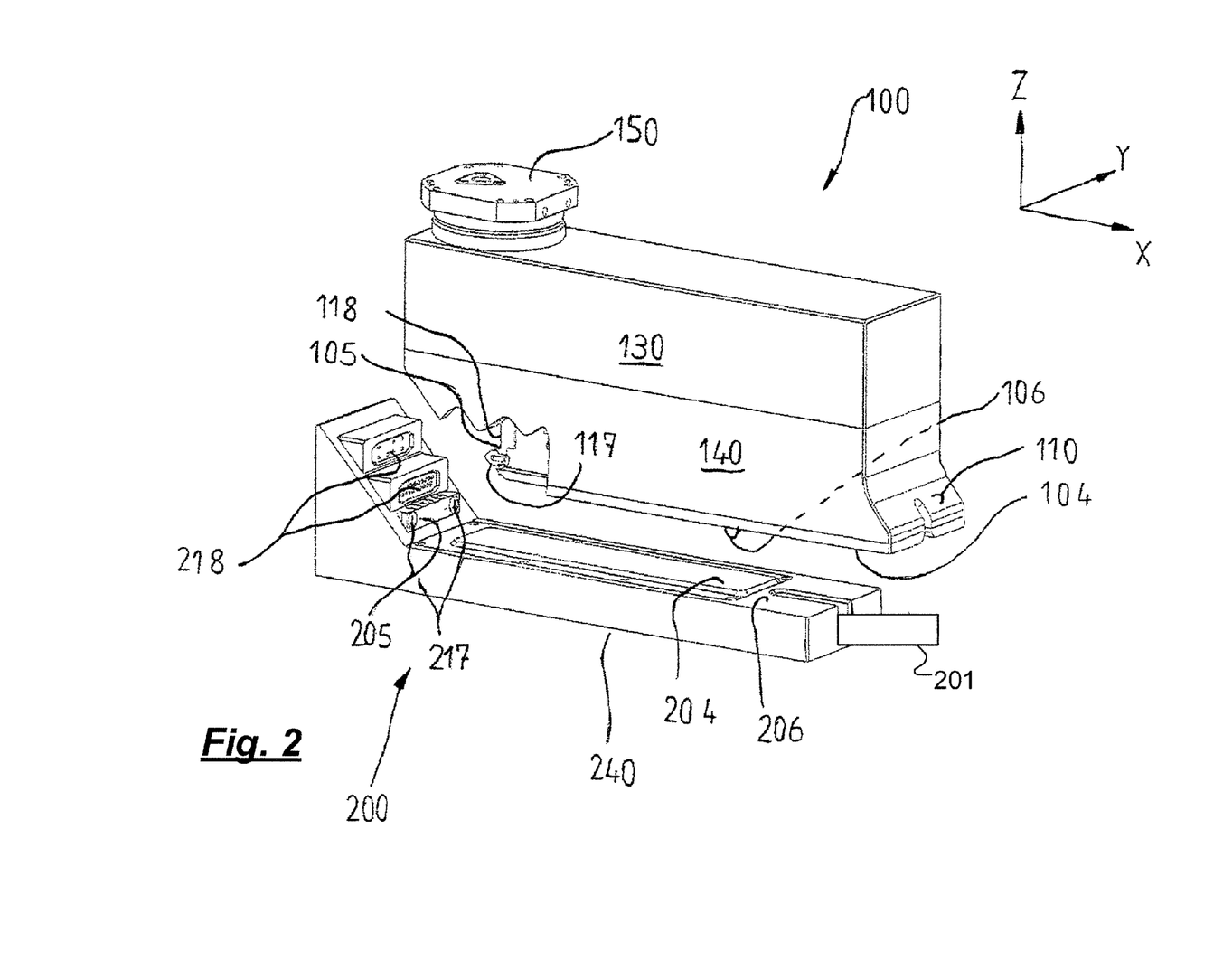
FIG. 2 shows a perspective view of a weighing cell with associated receiving holder having a different quick-clamping connection scheme.

FIG. 2 shows a perspective view of a weighing cell with associated receiving holder having a different quick-clamping connection scheme. Specifically, the depicted features are all similar to those in FIG. 1, except the spring-loaded, detachable latch mechanism 201, which connects the weighing cell in a stable and secure way to the holder and which is to be operated easily and without a tool.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing cell adapted for use in an associated receiving holder, wherein the receiving holder is provided for arrangement in a machine designed for weighing tasks, the weighing cell comprising:
   (a) a weighing mechanism in a housing;
   (b) one or more electrical contacts mounted on the housing for transmitting power-supply voltage or signals;
   (c) alignment elements positioned on the housing, which are formed for interaction with alignment elements of the receiving holder, the alignment elements on the housing being separate from each electrical contact and including (i) a first alignment element providing a first stop face, and (ii) a second alignment element providing a second stop face lying in a plane extending transverse to the plane of the first stop face;
   (d) wherein the weighing cell is adapted to form at least one detachable mechanical and electrical connection with the receiving holder through the use of the weighing cell placed in an inserted state in the receiving holder; and
   (e) wherein the weighing cell is adapted to be both mechanically and electrically connected detachably to the receiving holder by means of at least one quick-clamping connection.

2. The weighing cell of claim 1, wherein the at least one quick-clamping connection is designed for manual coupling of the weighing cell to the receiving holder without requiring a tool.

3. The weighing cell of claim 1, wherein the at least one quick-clamping connection is designed as a spring-loaded, detachable latch mechanism.

4. The weighing cell of claim 1, wherein at least one alignment elements of the weighing cell has a guide element that is complementary to a corresponding guide elements of the receiving holder in order to secure the weighing cell against twisting or lateral shifting perpendicular to these guide elements during the insertion into the receiving holder.

5. The weighing cell of claim 1, wherein at least one alignment element of the weighing cell includes at least one centering means, which interacts in the inserted state with a complementary centering means of the receiving holder, in order to fix the position of the weighing cell relative to the receiving holder in at least one direction.

6. The weighing cell of claim 1, wherein the quick-clamping connection is constructed in the form of a pivoting locking screw which is adapted to press on a surface inclined at an angle on the housing of the weighing cell or on the receiving holder when the locking screw is tightened and thereby adapted to form a tension force between the weighing cell and the receiving holder simultaneously in at least two of three directions (X, Y, and Z), in order to tension the weighing cell in these directions against the receiving holder.

7. The weighing cell of claim 1, wherein the one or more electrical contacts are realized as spring contacts.

8. The weighing cell of claim 1, wherein the one or more contacts are completely enclosed by the weighing cell and receiving holder in the inserted state for protection from external influences.

9. The weighing cell of claim 1, wherein the weighing cell has at least one essentially hermetically separated region inside the housing, which is provided for receiving weighing cell electronics.

10. The weighing cell of claim 1, wherein the weighing cell has means for calibration locking.

11. A receiving holder for receiving a detachable weighing cell, wherein the weighing cell is provided for arrangement in a machine designed for weighing tasks, the receiving holder comprising:
   (a) one or more electrical contacts for transmitting power-supply voltage or signals;
   (b) alignment elements which are formed for interaction with alignment elements of the weighing cell and are separate form the one or more electrical contracts, the alignment elements including (i) a first alignment element providing a first stop face, and (ii) a second alignment element providing a second stop face, the second stop face lying in a plane extending transverse to a plane of the first stop face;
   (c) wherein the receiving holder is adapted to form at least one detachable mechanical and electrical connection with the weighing cell through the use of the weighing cell placed in an inserted position in the receiving holder; and
   (d) wherein the receiving holder is adapted to be both mechanically and electrically connected detachably to the weighing cell by means of at least one quick-clamping connection.

12. The receiving holder of claim 11, wherein an electrical or mechanical locking device adapted for interacting with the weighing cell is provided, in order to turn on definable, electrical contacts that are connected via the receiving holder to the weighing cell only when the weighing cell is inserted into the receiving holder or another definable, electrical, mechanical, or electromechanical contact is created between the weighing cell and holder.

13. The receiving holder of claim 11, wherein the receiving holder has an electrical connection space for the arrangement of electrical or electronic components.

14. The receiving holder of claim 13, wherein the connection space is constructed for receiving electronics belonging to the weighing cell or non-associated electronics.

15. The receiving holder of claim 11, wherein the receiving holder has means for calibration locking.

16. The receiving holder of claim 11, wherein a protective device is provided for electrical contacts of the receiving holder that are connected to the weighing cell, wherein this protective device automatically protects the contacts on the receiving holder or the weighing cell against contamination when the weighing cell is removed.

17. The receiving holder of claim 11, further comprising the detachable weighing cell.

18. A weighing system comprising:
(a) a detachable weighing cell having an associated electrical contact;
(b) a complementary receiving holder adapted to receive the weighing cell, the receiving holder having an associated electrical contact that is complementary to the electrical contact associated with the weighing cell;
(c) wherein the weighing cell has alignment elements, which are formed for interaction with complementary alignment elements of the receiving holder, the alignment elements of the weighing cell being separate from the electrical contact associated with the weighing cell and including (i) a first alignment element providing a first stop face, and (ii) a second alignment element providing a second stop face lying in a plane extending transverse to a plane of the first stop face;
(d) wherein the weighing cell is adapted to form at least one detachable mechanical and electrical connection with the receiving holder through the use of the weighing cell placed in an inserted position in the receiving holder; and
(e) wherein the weighing cell is adapted to be both mechanically and electrically connected detachably to the receiving holder by means of at least one quick-clamping connection.

19. The weighing system according to claim 18, wherein the weighing cell and receiving holder form at least one explosion-proof space when combined.

20. The weighing system according to claim 19, wherein the explosion-proof space is formed before a definable electrical connection is produced between the weighing cell and receiving holder.

21. The weighing system of claim 18 wherein the detachable mechanical and electrical connection is used to transmit measurement data.

* * * * *

UNITED STATES PATENT AND TRADEMARK OFFICE
CERTIFICATE OF CORRECTION

| | | |
|---|---|---|
| PATENT NO. | : 8,076,596 B2 | Page 1 of 1 |
| APPLICATION NO. | : 12/090075 | |
| DATED | : December 13, 2011 | |
| INVENTOR(S) | : Burkart | |

It is certified that error appears in the above-identified patent and that said Letters Patent is hereby corrected as shown below:

At column 11, line 54: change "elements of the" to read --element of the--.

At column 11, line 55: change "guide elements of" to read --guide element of--.

Signed and Sealed this
Thirty-first Day of January, 2012

David J. Kappos
*Director of the United States Patent and Trademark Office*